April 18, 1933.  R. H. WAPPLER  1,904,020
TEMPERATURE CONTROLLING APPARATUS
Filed Oct. 26, 1929    2 Sheets-Sheet 1
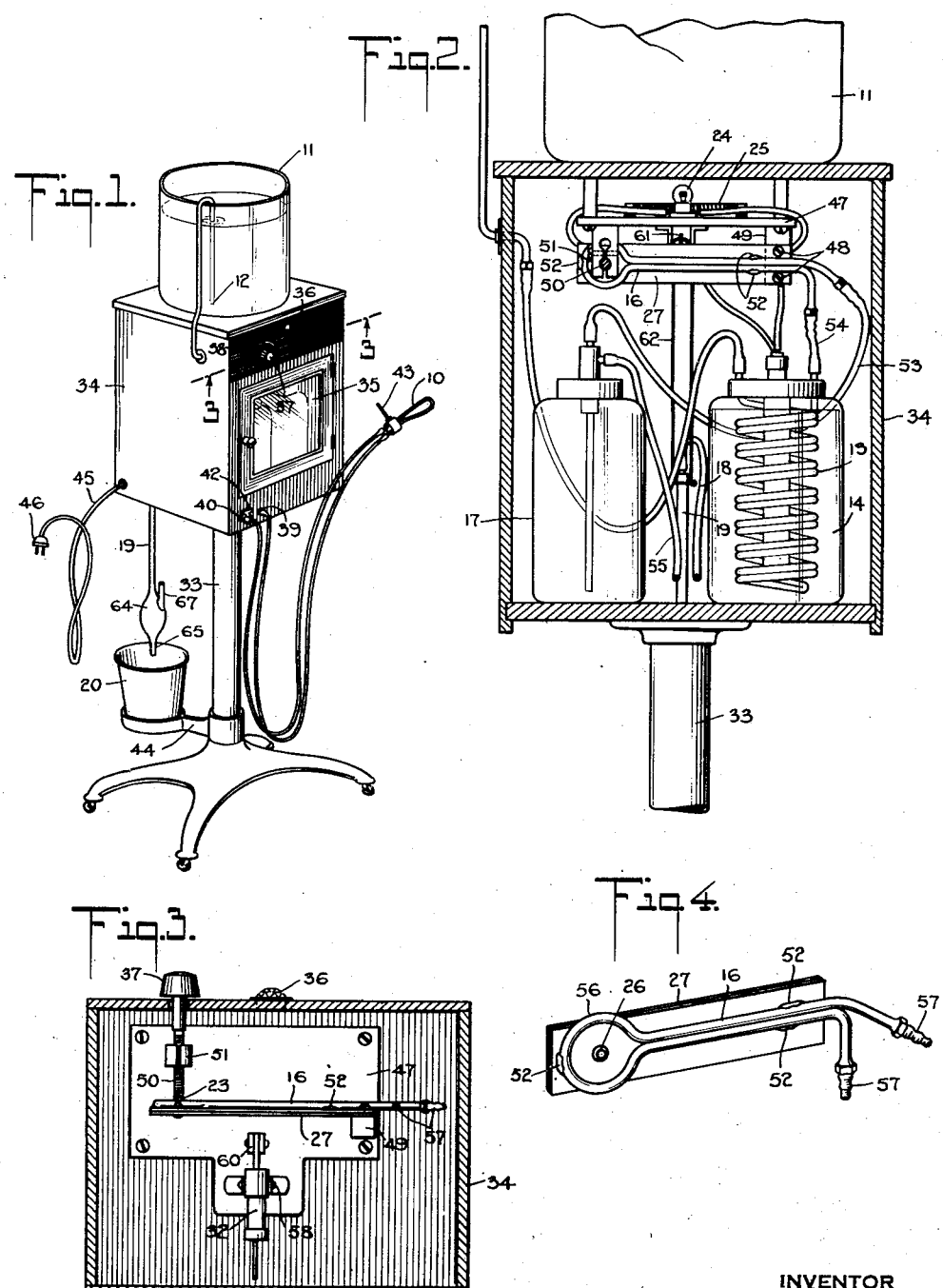
INVENTOR
Reinhold H. Wappler
BY
Frederick Breitenfeld
ATTORNEY April 18, 1933.  R. H. WAPPLER  1,904,020
TEMPERATURE CONTROLLING APPARATUS
Filed Oct. 26, 1929  2 Sheets-Sheet 2
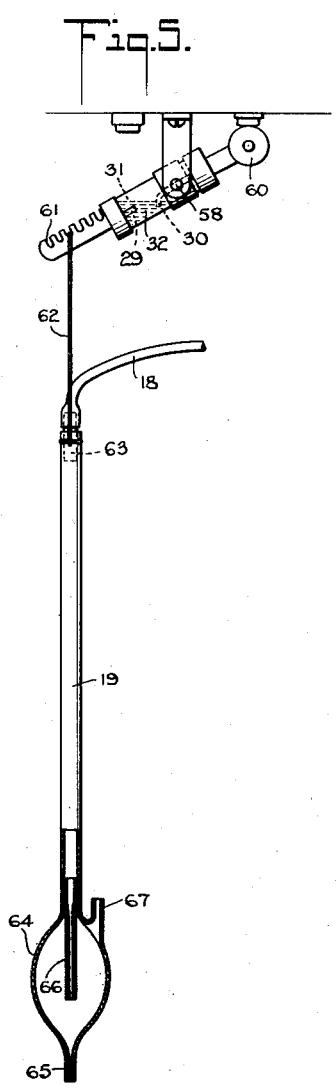
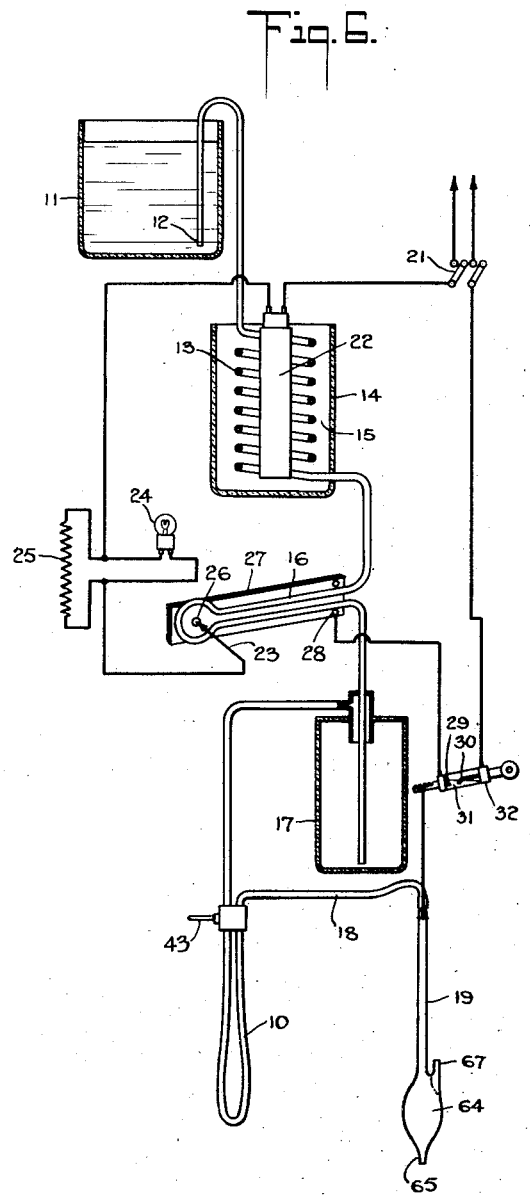
INVENTOR
Reinhold H. Wappler;
BY
Frederick Breitenfeld
ATTORNEY Patented Apr. 18, 1933

1,904,020

UNITED STATES PATENT OFFICE

REINHOLD H. WAPPLER, OF YONKERS, NEW YORK

TEMPERATURE CONTROLLING APPARATUS

Application filed October 26, 1929. Serial No. 402,581.

My present invention relates generally to temperature-controlling apparatus, and has particular reference to a type of apparatus which utilizes flowing liquid, such as water. Although my invention is not restricted to the medical art, as will be apparent after this specification has been read, I consider one useful application to lie in an apparatus wherein a liquid, such as water, is applied at an accurately maintained temperature to portions of the human body, as, for example, by means of an applicator; and I have herein illustrated and shall hereinafter describe an apparatus of this character for the purpose of illustrating the nature of my invention.

It is well known that many diseases are caused by germs which are unable to withstand certain definitely known temperatures. For example, certain venereal germs or cocci germs cannot stand a heat in excess of 108° F. As a result, a substantially prolonged application of heat of at least 108°, say, 120° F., will surely eradicate such germs.

At the same time, it is equally well known that human tissues can withstand heat up to about 140° F. but will be destroyed above that temperature.

Accordingly, the attempts to apply heat by electrical means, as for example, by passing a high-frequency current through the diseased tissue and through the body of the patient, have oftentimes proved dangerous; and such heat treatment is at best a matter of guesswork because of the difficulty accurately to maintain the applied temperature within desired limits. For instance, the heat generated by a current passed through the body will depend upon the resistance of the body, and since this resistance varies in different persons, and particularly in differently diseased tissues, it is in many cases impossible to maintain a prolonged application of heat which is safely and positively above the temperature at which the germs are killed and below the temperature at which normal body tissues are injured.

I have found that a liquid, such as water, heated to a desired temperature and applied to the diseased tissue either directly or preferably by means of a hollow applicator is a highly satisfactory medium for applying an accurately maintained degree of heat. The employment of water for this purpose is not broadly new, but previous devices and arrangements have not proved to be commercially successful because of the necessity for many complicated adjustments and manipulations and because of an inability to maintain the temperature accurately constant.

It is a general object of my present invention to provide an apparatus for automatically maintaining the temperature of a liquid of the foregoing character accurately constant over prolonged periods of time, and, in fact, my apparatus is capable of maintaining the temperature of flowing water, for example, accurately within a range of no more than a half degree from a desired point for periods as long as an hour or more.

The efficiency, accuracy, and commercial practicability of my present apparatus is dependent upon a number of improvements which may themselves be patentably novel, and which result in providing a temperature-controlling apparatus having highly satisfactory and desirable novel characteristics.

Where I employ a hollow applicator for the flowing liquid, together with an electric heating unit and a thermostatic switch, it is a particular feature of my present invention to provide a conduit for the flowing liquid having one portion associated with the heating unit and another portion with the thermostat. More particularly, I provide a conduit of relatively small and substantially uniform cross-section throughout so that liquid will flow therethrough at the very slow rate of approximately one gallon per hour; and I associate a coiled portion of this small conduit with an electric heating unit so that the liquid flowing through the conduit will be heated; and I associate another portion of the conduit in contacting relationship with a temperature-responsive element of the thermostat. I prefer to employ a bi-metallic strip as the temperature-responsive element, and, in such an event, the last-mentioned conduit portion is of metal or similar heat-conducting material and is securely affixed to the bi-metallic strip. This arrangement of parts causes each minute particle of liquid as it flows through the conduit to affect the bi-metallic strip, and as a result, a high degree of accuracy is achieved which, to my knowledge, has not been heretofore capable of accomplishment.

Another feature of my invention lies in providing an improved mechanism and association of parts whereby the entire apparatus is rendered practically fool-proof in so far as burning out of the electric heating unit, failure of liquid, etc., are concerned. More specifically, I provide an automatically controlled mechanism which causes the electrical circuit of the heating unit and thermostat to be established only when liquid is flowing in the contemplated manner. I accomplish this result by an improved flow-actuated electric switch associated with the drain of the system.

Other features of my invention will be clearly pointed out hereinafter, and reside in the construction and arrangement of the parts which render my entire apparatus simple and compact, staunch, and uniformly reliable in operation.

I achieve the foregoing objects and such other objects as may hereinafter appear or be pointed out, in the manner illustratively exemplified in the accompanying drawings, in which—

Figure 1 is a perspective view of a complete apparatus;

Figure 2 is a cross-sectional view on an enlarged scale taken from the front of the apparatus;

Figure 3 is an enlarged cross-sectional view taken upwardly in the direction 3—3 of Figure 1;

Figure 4 is an enlarged perspective view of the improved thermostatic device;

Figure 5 is an enlarged detail view, partly in section, of the automatically controlled electric switch;

Figure 6 is a diagrammatic view showing the relative arrangement of parts.

Referring for the moment to Figure 6, I will point out that 10 is a hollow applicator of suitable size, shape, and material to be applied into a body cavity, for example, and adapted to permit the passage of liquid therethrough. This applicator is arranged in series with a conduit which extends from a supply tank to a drain and which may be traced from the supply tank 11 shown at the upper portion of Figure 6.

The tank 11 is preferably of glass and has a capacity of approximately one gallon. The upper end 12 of the conduit is positioned at the bottom of the tank 11 and extends upwardly around the upper edge of the tank so as to effect a siphoning of the liquid in the tank. The siphoning of the liquid is of importance in connection with the other features of my apparatus and provides for a uniformity of flow not otherwise achievable.

The conduit extends downwardly to a coiled portion 13 immersed in a suitable heating tank 14 adapted to contain a heat-conducting medium 15 such as water. From here, the conduit extends through the shortest possible route to the U-shaped or doubled-back portion 16 associated with the thermostat. The conduit then extends to the bottom of an equalizer chamber or tank 17 which "irons out" slight irregularities in temperature. The equalizer tank 17 may or may not be employed, and the system provides for accurately uniform temperature (within one degree) even without this tank.

The conduit continues from the upper end of the tank 17 and extends to the applicator 10, thence through a portion 18 to the drain portion 19. The latter is positioned over a suitable receptacle 20 (Figure 1) from which the liquid may be taken for reemployment, if desired.

Still referring to Figure 6, I will trace the electrical circuit from the main switch 21. It extends through an electric heating unit 22 which is immersed in the chamber 14 along with the coil 13. The circuit then continues to the fixed terminal 23 of the thermostatic switch, and arranged in series with the circuit is a suitable indicating lamp 24, the employment of which is optional. Where the lamp is employed, a shunt resistance 25 is provided.

The other terminal 26 of the thermostatic switch is mounted upon the bi-metallic conductive strip 27, and the circuit continues from the terminal 28 to a second switch which I have shown as a mercury switch. In Figure 6, the two terminals 29 and 30 of the mercury switch are shown immersed in the mercury 31, but it will be understood that when the casing 32 of the mercury switch is pivoted, the mercury will break the electrical connection between the terminals 29 and 30. From the terminal 30, the circuit extends back to the main switch 21.

In Figure 1, I have shown a preferred arrangement of the parts to provide an apparatus of great simplicity and pleasing appearance for practical use in, for example, a surgeon's office or operating room. Mounted upon a stand 33, I have shown a box or casing 34 within which most of the parts hereinbefore described are arranged. On top of the box is the supply tank 11, and extending from it and into the box will be seen the conduit portion which leads to the coil 13.

The front of the box is preferably provided with a glass door 35. Above the latter I have shown the possible arrangement of a ruby glass or the like 36 through which the lamp 24 indicates its lit or its extinguished condition. I have also shown a manually controllable knob 37 which controls the adjustment of the thermostat and hence the temperature which it is desired accurately to maintain. A suitably calibrated temperature scale 38 is associated with the knob 37.

At the lower portion of the chamber 34 I have shown inlet and outlet nipples 39 and 40 to which the applicator 10 may be connected by means of the tubing 41. A stop cock 42 is associated with one of the nipples 39—40. I prefer to mount a small mercury thermometer 43 in close proximity to the applicator 10.

Extending downwardly from the box 34 is the drain 19, the waste receptacle 20 being preferably carried upon a bracket 44 or the like. The electrical connection may be made by means of the cable 45 provided with the usual two-pronged plug 46 adapted to be inserted into any suitable electric outlet.

In Figure 2, I have shown the preferred arrangement of parts within the box 34. Suspended from the top wall I provide a platform 47, preferably of slate, and carried by this platform on its upper surface is the lamp 24 and the shunt resistance 25. Mounted on the platform 47, and beneath the latter, I have shown the bi-metallic strip 27. The latter is secured at one end, as by means of screws or bolts 48, to a block 49 secured to the platform 47. The other or free end of the strip 27 carries the terminal 26. The fixed terminal 23 is carried on the end of a threaded shank 50 mounted within the slit threaded bearing block 51. The latter is secured to the platform 47.

The doubled-back conduit portion 16 is shown attached to the bi-metallic strip 27 by means of solder or the like applied preferably at isolated points 52. From this portion 16, the conduit is seen to extend at 53 to the equalizer jar or tank 17, and at 54 to the coil 13. The conduit is seen at 55 to extend from the tank 17 to one of the nipples 39—40, not visible in this figure.

In Figure 4, I have shown the association of the conduit portion 16 with the bi-metallic strip 27 in greater detail. The portion 16 is preferably of copper or similar heat-conductive material and although it need not necessarily be U-shaped as shown, I prefer this construction, the doubled-back portions or arms of the U being arranged side by side substantially along the axis of the strip 27. The attachment at points 52 maintains the portion 16 in heat-transmissive contact with the strip 27 without interfering with the free and necessary movability of the latter under the action of the heat. The portion 16, it will be seen, is preferably provided with the rounded loop 56 which encircles the terminal 26. At its ends, the portion 16 is preferably caused to terminate in the attachment nipples 57, whereby rubber tubing or the like, constituting the adjacent conduit portions, may be easily and quickly associated therewith during assembly.

In Figure 3, I have shown the mounting of the thermostatic switch in greater detail, and I have also shown the manner in which the mercury switch is pivotally mounted. In this figure, the platform 47 is viewed from underneath, and the relative arrangements of the supporting blocks 49 and 51 will be seen. The threaded shank 50 extends outwardly to the knob 37 so that adjustment of the latter will vary the position of the fixed terminal 23 by desired slight amounts.

The platform 47 is provided with a pivot bearing 58 for the casing 32 of the mercury switch. At one end, this casing is provided with the threaded rod 59 upon which a weight 60 is accurately adjustable. At the other end, casing 32 is provided with the toothed arm 61 adapted to support the suspension cable or device 62.

Upon referring to Figure 5, it will be seen that the wires 62 extend downwardly and suspend the drain tube 19 in the upper end of which a small attachment tube 62 is provided for association with the conduit portion 18.

At its lower end, the drain tube 19 enlarges to provide the enlarged portion 64, the latter being provided with an outlet neck 65 of reduced diameter. The bore of the neck 65 is approximately one millimeter.

Mounted in the lower end of the tube 19 is the tubular portion 66 extending downwardly to a considerable extent into the enlarged portion 64 and also of reduced bore (approximately one and one-half millimeters). At the upper end of the enlarged portion 64 is the air vent 67.

The operation of the apparatus is as follows:—The parts are so adjusted that when no liquid is flowing, the weight of the drain tube 19 and of the empty enlarged portion 64 will be insufficient to overcome the effect of the weight 60, and accordingly, the mercury switch will be tilted in the opposite direction under normal conditions, so that it might be stated that the electric circuit is normally open. The proper and desired applicator 10 having been applied to the attachment nipples 39 and 40, and the plug 46 having been inserted into a suitable electric outlet, the pet-cock 42 is turned on so that water will commence to flow through the system from the tank 11 to the drain. There is nothing further for the operator to do except to adjust the knob 37 to the degree of temperature desired. For example, this may be adjusted to, say, 125° F., whereby germs unable to withstand this temperature will be killed while normal body tissues will remain unaffected.

The automatic operation of my apparatus will now be evident. The reduced bore of the outlet neck 65 causes the enlarged portion 64 to fill up, air being allowed to escape through the vent 67. The weight of this enlarged portion thereby increasing, the mercury switch will presently be tilted into the position shown in Figures 5 and 6, this closing the electrical circuit through the terminals 29 and 30. The terminals 23 and 26 of the thermostat are also normally closed, as will be readily understood, and as a result, current will pass through the heating unit 22, and the lamp 24 will indicate this fact.

The heat from the unit 22 is transmitted through the medium 15 to the liquid flowing in the coil 13, and this heated liquid will in turn transmit its heat through the doubled-back portion 16 to the bi-metallic strip 27. As soon as a predetermined temperature is reached, the bi-metallic strip 27 will move and break the contact between the terminals 23 and 26. This will extinguish the lamp 24 and will also break the current flowing through the heating unit 22. Should the temperature of the liquid flowing through the system, and hence through the portion 16, fall below the desired temperature, contact will again be automatically established between the terminals 23 and 26, the lamp will light, and the heating unit 22 will again become operative. This is of course the well known functioning of a thermostat.

Slight inequalities of temperature, due to making and breaking of the circuit at the thermostat, will be "ironed out" in the chamber 17, and an accurately uniform temperature will be recorded on the thermometer 43. The applicator 10 will therefore safely and surely supply exactly the correct amount of heat to the particular diseased portion, and this may be maintained indefinitely by simply keeping the tank 11 filled. As a rule, this application will not exceed one-half hour or so, and since the tank 11 does not empty for an hour or more, no constant re-filling is necessary.

When the treatment is completed, the operator merely turns off the pet-cock 42, and is not obliged to do anything further, because the liquid in flowing out of the system will empty the enlarged portion 64 and the circuit will automatically be broken by the operation of the weight 60.

Should the operator through inadvertence fail to observe that the tank 11 has emptied, the circuit will similarly be broken, since the failure of liquid in the system will invariably cause the weight 60 to function. In other words, the mercury switch closes the circuit only when liquid is flowing through the system.

I do not claim broadly the employment of a thermostatic switch in an electric circuit, nor even in an apparatus of the present character, but I wish to stress the importance of the particular arrangement I have herein described and illustrated whereby an accuracy of less than one degree may be maintained for long periods of time. This desirable operation is due to the fact that the thermostat is not acted upon by large masses of liquid (wherein convection currents and the like lead to inaccuracy and error), but is acted upon and operated by means of the heat transmitted from a relatively small heat-conductive conduit portion held in contactive relationship to the temperature-responsive element. Every drop of water passing through the system contributes to the operation of the thermostat and it is this mode of functioning and of cooperative working which leads to the achievement of the present highly desirable results.

Also, it will be obvious that although I have herein described and illustrated my invention as applied to a medical apparatus, other and widely diverse uses are nevertheless within the purview of my invention. For example, it may be used for such purposes as curling hair, and it may find wide applicability in the treatment of food stuffs for the purpose of subjecting the same to a predetermined accurate temperature insufficient to destroy vitamins. In general, where water is employed, it can be used for any purpose wherein a constant and accurately maintained temperature up to approximately 200° F. is desired.

It will be understood that where the term "accurately maintained temperature", or any similar terminology, is used herein or in the appended claims, it is intended to signify no more than a range of accuracy whereby a flowing liquid may be maintained within approximately a half degree from a desired point.

Numerous modifications and improvements will readily suggest themselves to those skilled in the art. For example, an additional safeguard may lie in providing a second thermostatic device in association with the heating tank 14, for the purpose of preventing undue heating of the medium 15, which is preferably water. Also, the mercury switch may be replaced by a different type of switch, and the weighted drain may be constructed in a variety of ways.

In general, it will be understood that the details herein described and illustrated for the purpose of explaining the nature of my invention may be changed by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is—

1. In a device of the character described, a hollow applicator adapted to permit a liquid to flow therethrough, a liquid supply tank, a heating tank having an electric heating unit therein, a bimetallic thermostatic strip in the circuit of said heating unit, and a continuous, relatively fine conduit extending from the supply tank to said applicator and thence to a drain, said conduit having a coiled portion immersed in said heating tank and a doubled-back portion in direct contact with said thermostatic strip.

2. In a device of the character described, a hollow applicator adapted to permit a liquid to flow therethrough, a liquid supply tank, an electric heating unit, a bimetallic thermostatic strip in the circuit of said unit, and a continuous, relatively fine conduit extending from the supply tank to said applicator and thence to a drain, said conduit having a coiled portion associated with said heating unit and a doubled-back portion in direct contact with said thermostatic strip.

3. In a thermostatic device of the character described, an elongated bimetallic strip, means for securing said strip at one end and for permitting the opposite end to deflect into and out of a normal position under the influence of varying temperatures, and a heat-conductive conduit for liquid secured to said element in direct contact therewith so that said strip will react to variations in temperature of the liquid flowing through said conduit.

4. In a device of the character described, an applicator adapted to permit a liquid to flow therethrough, a liquid supply tank, an electric heating unit, a normally open electric switch in the circuit of said heating unit, a relatively fine, continuous conduit extending from the supply tank to said applicator and thence to a drain, said conduit having a portion associated with said heating unit to draw heat from the latter, and means for automatically closing said switch only when liquid is flowing through said conduit from said supply tank to said drain.

5. In a device of the character described, an applicator adapted to permit a liquid to flow therethrough, a liquid supply tank, an electric heating unit, a normally open electric switch with the circuit of said heating unit, a relatively fine, continuous conduit extending from the supply tank to said applicator and thence to a drain, said conduit having a portion associated with said heating unit to draw heat from the latter, and means for automatically closing said switch only when liquid is flowing through said conduit from said supply tank to said drain, said last-named means comprising an enlargement in said conduit at said drain, and means automatically operable by the increased weight of said enlargement during the flow of liquid therethrough for closing said switch.

6. In a device of the character described, a hollow applicator adapted to permit a liquid to flow therethrough, an electric heating unit, a liquid supply tank, a relatively fine, continuous conduit extending from said supply tank to said applicator and thence to a drain, said conduit having a portion associated with said heating unit, said conduit having a constricted outlet opening and an enlargement adjacent to said constriction, a normally open electric switch in the circuit of said heating unit, and means for automatically closing said switch by means of the increase in weight of said enlargement due to the flow of liquid through said conduit.

In witness whereof I have signed and sealed this specification this 19th day of October, 1929.

REINHOLD H. WAPPLER.